United States Patent
Tulaczko et al.

(10) Patent No.: US 6,237,334 B1
(45) Date of Patent: May 29, 2001

(54) HYDRAULIC ACTUATION DEVICE

(75) Inventors: Boleslaw Tulaczko, Niederwerrn; Volker Stampf, Schweinfurt, both of (DE)

(73) Assignee: Mannesmann Sachs AG, Schweinfurt (DE)

(*) Notice: Subject to any disclaimer, the term of this patent is extended or adjusted under 35 U.S.C. 154(b) by 0 days.

(21) Appl. No.: 09/303,961

(22) Filed: May 3, 1999

(30) Foreign Application Priority Data

May 8, 1998 (DE) .............................................. 198 20 578

(51) Int. Cl.[7] ...................................................... B60T 11/30
(52) U.S. Cl. ................................................... 60/584; 92/79
(58) Field of Search ............................. 60/562, 584, 592; 92/79, 163

(56) References Cited

U.S. PATENT DOCUMENTS

| | | | |
|---|---|---|---|
| 741,627 | * 10/1903 | Conner | 91/163 |
| 2,531,705 | * 11/1950 | Schultz | 60/585 |
| 4,318,460 | * 3/1982 | Kosinski | 60/584 |
| 4,989,498 | * 2/1991 | Mori et al. | 60/562 |

FOREIGN PATENT DOCUMENTS

| | | |
|---|---|---|
| 196 08 132A1 | 5/1997 | (DE) . |
| 89/11600 | 11/1989 | (WO) . |

* cited by examiner

*Primary Examiner*—F. Daniel Lopez
(74) *Attorney, Agent, or Firm*—Cohen, Pontani, Lieberman & Pavane

(57) ABSTRACT

A hydraulic actuation device for the adjustment of units in motor vehicles includes a piston-cylinder unit with a housing and a piston displaceably arranged in the cylinder portion of the housing and/or in a guide sleeve in the housing. The piston-cylinder unit may be a slave cylinder or a master cylinder. The cylinder has a connection channel along one of its surface lines with an outer channel wall which is located in a portion of the connection channel located farthest from a center axis of the cylinder. The outer channel wall approximately follows a straight line and has an angle of inclination relative to the center axis which is greater than zero and preferably equal to or greater than a maximum installation angle of the installed position of the housing. The described arrangement of the deaeration bore hole at the highest possible location in the pressure space of the cylinder is advantageous for a deaeration of the hydraulic system for repairs and servicing.

4 Claims, 2 Drawing Sheets

HYDRAULIC ACTUATION DEVICE

BACKGROUND OF THE INVENTION

1. Field of the Invention

The invention is directed to a hydraulic actuation device for the adjustment or positioning of an actuation element or an element to be operated in motor vehicles. The hydraulic actuation device includes a piston-cylinder unit having a cylinder housing and a piston axially movable in the cylinder.

2. Description of the Related Art

A prior art hydraulic actuation device including a piston-cylinder unit is known from DE 196 08 132 A1. This prior art device has a cylinder with a cylinder housing forming a cylinder space. In the preferred embodiment, the cylinder is a master cylinder in a hydraulic system in a motor vehicle. A piston is arranged so as to be displaceable axially in the cylinder space and a piston rod connected to the piston in a positive engagement is guided out of the cylinder housing. In addition to the above-described solution to the problem of connecting a piston with a piston rod, FIGS. 1 and 1a of the prior art reference show a cylinder space which has, along a surface line, a channel which extends parallel to the center axis of the cylinder housing and which, when the piston is displaced, produces a connection between the respective diminishing cylinder space and a primary seal to maintain the pressure ratios at the cylinder side of the primary seal at the pressure level of the medium to be compressed.

If the cylinder space and the pressure line system connected thereto are to be filled with a liquid medium which is required to be free of bubbles, difficulties are encountered if precautions are not taken. For example, the cylinder must be filled before the piston assumes its fully extended position so that a connection is formed between the cylinder space and the pressureless space located behind the primary seal. Using these precautions, any air bubbles present in the liquid may be guided to a compensation vessel through the pressureless space. However, once the prior art device is installed, it is difficult to release any air bubbles present in the liquid and may be impossible depending on the installed position of the cylinder.

SUMMARY OF THE INVENTION

The present invention proposes a master cylinder and/or slave cylinder for a hydraulic actuation device, wherein the cylinder space of the master cylinder and/or slave cylinder is deaerateable through a deaeration bore hole. The dearation may occur after the cylinder has been installed in a vehicle and the longitudinal axis of the cylinder may have an installed position that is at an angle greater than zero from the horizontal position.

Therefore, the object of the invention is to provide a cylinder for a hydraulic actuation device which is installed in a motor vehicle at an angle diverging from the horizontal and may be deaerated in an unobjectionable manner in all resulting installation positions.

This object is met by a hydraulic actuation device, comprising a cylinder housing having a surface forming a cylinder with a longitudinal center axis, a piston axially displaceably arranged in said cylinder, and a connection channel extending longitudinally along an inner wall of said cylinder and having an outer channel wall at a position in said channel located furthest from said center axis, said outer channel wall substantially following a straight line and having an angle of inclination with respect to said center axis greater than zero.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters reference similar elements throughout the several views.

DETAILED DESCRIPTION OF THE PRESENTLY PREFERRED EMBODIMENTS

Figure 1:
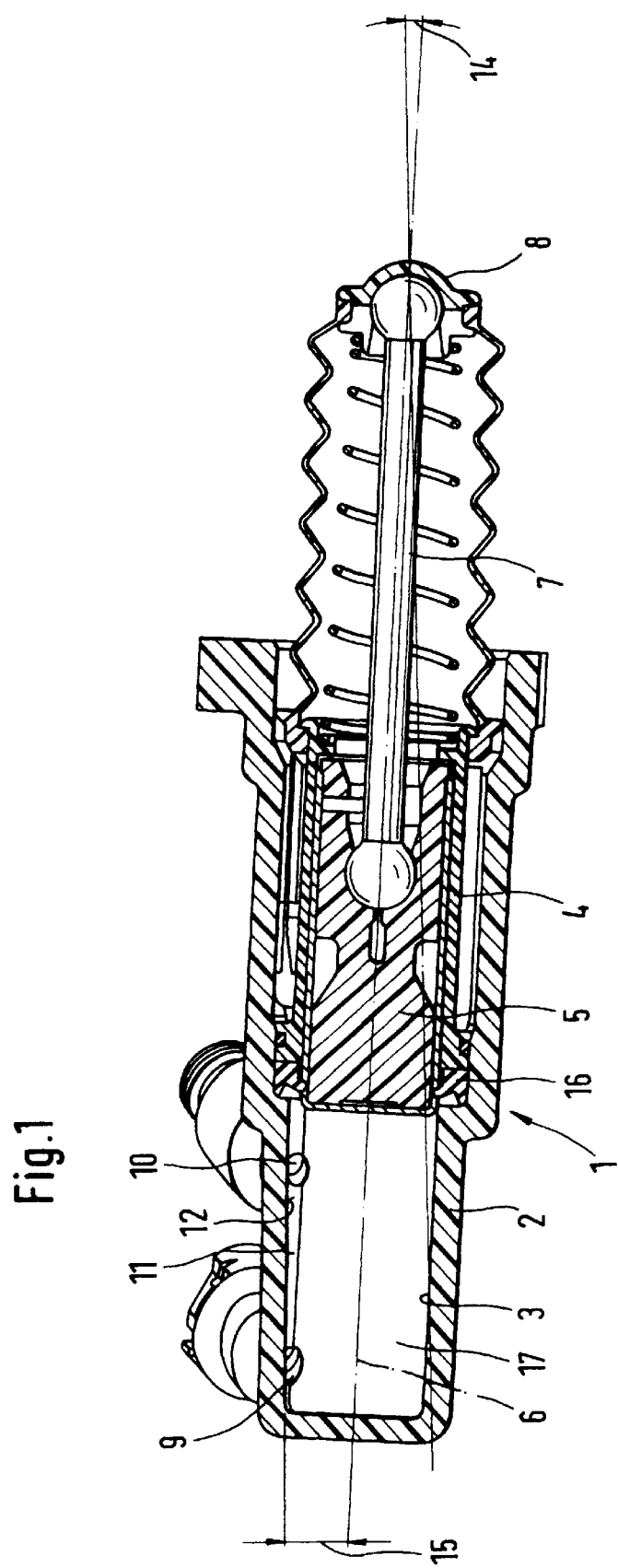
FIG. 1 shows a cylinder with a connection channel extending at an inclination to the center axis of the cylinder in an upwardly inclined installation position in a motor vehicle relative to a horizontal position.
Figure 2:
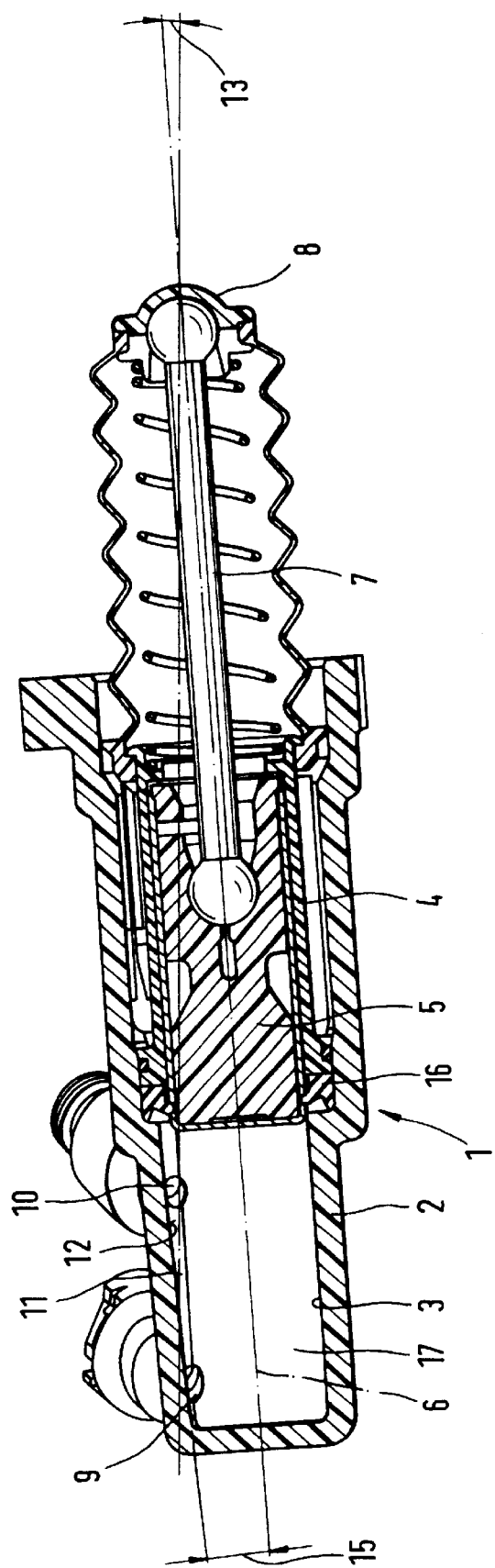
FIG. 2 shows the cylinder of FIG. 1 in an installation position of the cylinder which is inclined downward relative to the horizontal position.

Referring to FIGS. 1 and 2, a piston-cylinder unit 1, which may be a master cylinder or a slave cylinder, includes a housing 2 with a cylinder 3 in which a piston 5 is arranged so as to be axially displaceable. The piston 5 is arranged such that it communicates via a piston rod 7 with an actuation element or with an element to be operated. One end of the piston rod 7 is positively connected to the piston and a free end 8 of the piston rod 7 interacts with the actuation element or the element to be operated. The piston 5 creates a pressure space 17 in the cylinder 3 when the piston 5 moves from a moved in position to a moved out position. The pressure space 17 is connected with a corresponding actuation part via a connection 9 to a pressure line 9a. The piston 5 slides at least partially in a guide sleeve 4 in the housing 2 and is sealed relative to the housing 2 by a seal 16. Although one seal 16 is shown in the Figures, more than one seal may also be used as required by the specific application.

The housing 2 is usually connected with a transmission or other body part of a motor vehicle so that a center axis 6 of the piston-cylinder unit 1 forms an installation angle 14 relative to a horizontal line 20.

Thus, when the housing 2 at the transmission or other body part of the motor vehicle cannot be installed in an ideal horizontal position, the cylinder 3 is installed in either an inclined downward position shown in FIG. 1 with an installation angle 14 between the center axis 6 and the horizontal line 20 or an inclined upward position shown in FIG. 2 with a divergent installation angle 13 between the center axis 6 and the horizontal line 20. To properly deaerate the cylinder 3 in the installed state, prior art devices require that a deaeration hole be located at a highest point in the pressure space, which is the front side for the downward incline as in FIG. 1 and the rear side for the upward incline as in FIG. 2. In contrast, the present invention ensures that deaeration may be accomplished through a deaeration bore hole 10 in an installation position of the housing 2 in which the cylinder 3 is directed at a downward inclination or an upward inclination. To accomplish this, the deaeration bore hole 10 is arranged in a connection channel 11 having a depth which extends perpendicularly to the center axis 6 on a surface line of the cylinder 3. The connection channel extends from a closed end of the housing 2 to the seal 16. An outer channel wall 12 arranged in a portion of the connection channel 11 located farthest from the center axis 6 has an inclination angle 15 relative to the center axis 6. The inclination angle 15 is designed such that the outer channel wall 12 always occupies a positive angle relative to the horizontal line 20 for all installed positions of the housing 2. The deaeration bore hole 10 is arranged as close as possible to the location of the piston 5 shown in FIGS. 1 and 2, i.e., as close to the seal 16 as possible. Accordingly, the deaeration bore hole 10 is arranged proximate the uppermost point of this system as far as possible.

It has proven advisable to arrange the connection 9 to the pressure line 9a on the same surface line as the deaeration bore hole 10 because when mounting the housing 2 of the piston-cylinder unit 1 the connections for the pressure line connection 9 and for the deaeration bore hole 10 can be pushed through one and the same opening in the body sheet metal of the motor vehicle. After the housing 2 is fastened to the transmission or other body part of the motor vehicle, the angle of inclination 15 of the outer channel wall 12 to the center axis 6 of the cylinder 3 must be equal to or greater than the installation angle 14 which results when the cylinder housing 2 is installed with its center axis 6 sloping downward as in FIG. 1. In a preferred embodiment, the angle of inclination 15 is greater than the installation angle 14 such that any air located in the pressure space 17 ascends in the connection channel 11 diagonally upward toward the deaeration bore hole 10 to escape from the pressure space 17.

The described arrangement of the deaeration bore hole 10 at the highest possible location in the pressure space of the cylinder 3 is advantageous for a deaeration of the hydraulic system for repairs and servicing in both the inclined upward and the inclined downward positions of FIGS. 1 and 2.

The invention is not limited by the embodiments described above which are presented as examples only but can be modified in various ways within the scope of protection defined by the appended patent claims.

We claim:

1. A hydraulic actuation device, comprising:
   a cylinder housing having an inner wall forming a cylinder with a longitudinal center axis, said cylinder having a first end and a second end, wherein said first end is a closed end and said second end is an open end;
   a piston axially displaceably arranged through said second end in said cylinder;
   said cylinder housing and piston defining a pressure space between said second end and said closed end of said cylinder housing, said space comprises a pressure line connection being connectable to a pressure line of an actuation part, said cylinder housing being installable within a range of installation angles including a maximum installation angle relative to a horizontal line in which said closed end of said cylinder comprises the highest part of said cylinder and a minimum installation angle relative to a horizontal line in which said closed end of said cylinder comprises the lowest part of said cylinder; and
   a connection channel having a blind end facing away from said center axis and an open end facing said center axis, said connection channel extending longitudinally along said inner wall of said cylinder housing in said pressure space from a first end area proximate said closed end of said cylinder to a second end area proximate said open end of said cylinder and having an outer channel wall along said blind end of said connection channel, said outer channel wall substantially following a straight line and having an angle of inclination from said first end area to said second end area with respect to said horizontal line when said cylinder is arranged at said maximum installation angle that is not less than zero such that air in said pressure space is prevented from entering said pressure line connection, wherein said pressure line connection is arranged in said connection channel proximate said first end area of said connection channel.

2. The hydraulic actuation device of claim 1, wherein said connection channel is arranged along a surface of said cylinder such that a depth of said connection channel extends upward in a mounted state of said cylinder housing.

3. The hydraulic actuator of claim 1, wherein said cylinder comprises one of a slave cylinder and a master cylinder.

4. The hydraulic actuation device of claim 1, wherein said cylinder housing has a deaeration bore hole arranged through said outer channel wall proximate said second end of said connection channel facing said piston.

* * * * *